(12) United States Patent
Kawan (10) Patent No.: US 6,840,446 B2
(45) Date of Patent: Jan. 11, 2005

(54) APPARATUS AND SYSTEM FOR OPTICAL CARD READING AND METHOD OF USE

(75) Inventor: Joseph C. Kawan, Hollywood, CA (US)

(73) Assignee: Citicorp Development Center, Inc., Los Angeles, CA (US)

( * ) Notice: Subject to any disclaimer, the term of this patent is extended or adjusted under 35 U.S.C. 154(b) by 0 days.

(21) Appl. No.: 09/271,206

(22) Filed: Mar. 17, 1999

(65) Prior Publication Data

US 2003/0052159 A1 Mar. 20, 2003

Related U.S. Application Data

(60) Provisional application No. 60/079,366, filed on Mar. 26, 1998, and provisional application No. 60/078,506, filed on Mar. 18, 1998.

(51) Int. Cl.[7] ............................................. G06K 7/00
(52) U.S. Cl. ....................... 235/440; 235/493; 235/454; 235/440; 235/451; 361/737
(58) Field of Search ............................. 235/440, 451, 235/480, 492, 494; 705/17, 35, 39, 41, 43

(56) References Cited

U.S. PATENT DOCUMENTS

| | | | |
|---|---|---|---|
| 4,609,812 A | | 9/1986 | Drexler ...................... 235/487 |
| 4,684,791 A | * | 8/1987 | Bito .......................... 235/380 |
| 4,804,825 A | | 2/1989 | Bitoh ......................... 235/380 |
| 4,868,373 A | | 9/1989 | Opheij et al. ............... 235/380 |
| 4,910,774 A | * | 3/1990 | Barakat ...................... 235/380 |
| 4,985,920 A | | 1/1991 | Seki ........................... 380/23 |
| 5,012,076 A | * | 4/1991 | Yoshida ...................... 235/379 |
| 5,079,413 A | | 1/1992 | Sasaki ........................ 235/479 |
| 5,276,312 A | | 1/1994 | McCarthy ................... 235/380 |
| 5,514,856 A | * | 5/1996 | Kitahara et al. ............ 235/440 |
| 5,530,232 A | * | 6/1996 | Taylor ........................ 235/380 |
| 5,708,851 A | * | 1/1998 | Togawa ...................... 710/52 |
| 5,821,515 A | * | 10/1998 | Kitahara ..................... 235/441 |
| 5,834,756 A | * | 11/1998 | Gutman et al. ............. 235/493 |
| 5,895,909 A | * | 4/1999 | Yoshida ...................... 235/487 |
| 5,959,289 A | | 9/1999 | Okada et al. ............... 235/487 |
| 6,021,393 A | | 2/2000 | Honda et al. ................ 705/3 |
| 6,029,887 A | * | 2/2000 | Furuhashi et al. .......... 235/379 |
| 6,244,506 B1 | * | 6/2001 | Hartmann et al. .......... 235/380 |

FOREIGN PATENT DOCUMENTS

| | | | |
|---|---|---|---|
| EP | 0 330 404 A2 | 8/1989 | ............ G07F/7/10 |
| EP | 0 363 122 A2 | 4/1990 | ............ G07F/7/10 |
| EP | 0 619 564 A1 | 10/1994 | ........... G07B/17/10 |
| EP | 0 653 717 A2 | 5/1995 | ............ G06F/17/60 |
| EP | 0 793 186 A2 | 9/1997 | ............ G07F/7/08 |
| JP | 05205115 A * | 8/1993 | |
| JP | 405205115 A | 8/1993 | .......... G06K/19/00 |

OTHER PUBLICATIONS

Australian Patent Office Search Report and Written Opinion, dated Oct. 3, 2000.

* cited by examiner

*Primary Examiner*—Karl D. Frech
*Assistant Examiner*—Ahshik Kim
(74) *Attorney, Agent, or Firm*—George T. Marcout; Kilpatrick Stockton LLP (57) ABSTRACT

A method, system, and apparatus for reading from and writing to a multi-memory card, such as a bankcard, credit card, or smart card. The apparatus of the system includes reading devices, writing devices, and controllers for reading from and writing to the magnetic, optical, and electronic memory portions of a multi-memory card. The method of the present invention includes a method for controlling the reading from and writing to such cards via software applications that integrate control of a magnetic read/write component, an optical read/write component, an electronic read/write component and their respective transport mechanisms. The software applications integrate the multiple read/write components to allow such functions as for example bank and medical transactions to be performed utilizing a single multi-memory card.

12 Claims, 5 Drawing Sheets

APPARATUS AND SYSTEM FOR OPTICAL CARD READING AND METHOD OF USE

This application claims priority to provisional application Nos. 60/078,506 filed Mar. 18, 1998 and 60/079,366 filed Mar. 26, 1998.

FIELD OF THE INVENTION

The present invention generally relates to a method, system, and apparatus for reading from and writing to a multi-memory card, such as a bankcard, credit card, smart card or the like.

BACKGROUND OF THE INVENTION

Currently, nearly every American carries at least one credit card or bankcard in the form of a conventional size plastic card containing some type of memory component. Known memory components include magnetic stripes, optical stripes, and, most recently, electronic memories, such as microprocessors in the form of, for example, integrated circuit (IC) chip modules (hereafter "chip memories").

Magnetic stripe memories are used to provide identifying information when inserted into a conventional reader and are not generally known for their ability to have information written thereto, although this function is possible. The optical stripe is useful for its' ability to function in both a reading and writing capacity with significantly more memory than the magnetic stripe memories. Finally, the chip memories, while more limited in memory capacity than the optical stripe memory, are extremely useful in their ability to actually store and run programs for manipulating transaction data.

In order to facilitate the reading from and/or writing to these multiple memories, individual read/write components are necessary for each type of memory. Currently, there are separate, non-interchangeable read/write components available for each type of memory.

There is a need for a system of read/write components that is capable of reading from and writing to a variety of different memories located on the same card without having to manually remove and re-insert the card into different read/write components. Also, a system and method is needed that is capable of analyzing the information gained from the individual memories via the individual read/write components and redistributing the information among various memories would also be beneficial.

SUMMARY OF THE INVENTION

It is an advantage of the present invention to provide a method, system, and apparatus for reading from and writing to a multi-memory card, such as, by way of example, a bankcard, credit card, or smart card. The apparatus of the system includes reading devices, writing devices, and controllers for transporting the multi-memory cards between read/write components. The method of the present invention includes a method for controlling the reading from and writing to multi-memory cards.

The software applications of an embodiment of the present invention integrate control of a magnetic read/write component, an optical read/write component, an electronic read/write component and their respective transport mechanisms. The software applications thus integrate the multiple read/write components to allow such functions as for example bank and medical transactions to be performed utilizing a single multi-memory card.

An embodiment of the present invention includes a method for controlling the reading from and writing to a multi-memory card comprising: positioning a first memory of the multi-memory card within a first read/write component to facilitate reading from the first read/write component; reading information from the first memory; providing selectable functions in the form of a menu to a user; receiving a first selected function, the first selected function having an associated second read/write component; transporting the multi-memory card to the second read/write component according to the first selected function; positioning a second memory of the multi-memory card within the second read/write component to facilitate reading from and writing to a second read/write component; and performing the first selected function.

An embodiment of the present invention includes a system for reading from and writing to a multi-memory card comprising: means for positioning a first memory of the multi-memory card within a first read/write component to facilitate reading from the first read/write component; means for reading information from the first memory; means for providing selectable functions in the form of a menu to a user; means for receiving a first selected function, the first selected function having an associated second read/write component; means for transporting the multi-memory card to the second read/write component according to the first selected function; means for positioning a second memory of the multi-memory card within the second read/write component to facilitate reading from and writing to a second read/write component; and means for performing the first selected function.

An embodiment of the present invention includes a system for reading from and writing to a multi-memory card comprising: a read/write device; a transport device connected to the read/write device for transporting the multi-memory card within the read/write device; and a control device operatively coupled to the transport device and the read/write device for controlling the transport device and the read/write device.

Additional objects, advantages and novel features of the invention will be set forth in part in the description that follows, and in part will become more apparent to those skilled in the art upon examination of the following or upon learning by practice of the invention.

DETAILED DESCRIPTION

Reference will now be made to embodiments of the present invention, examples of which are illustrated in the accompanying drawings.

Figure 1A:
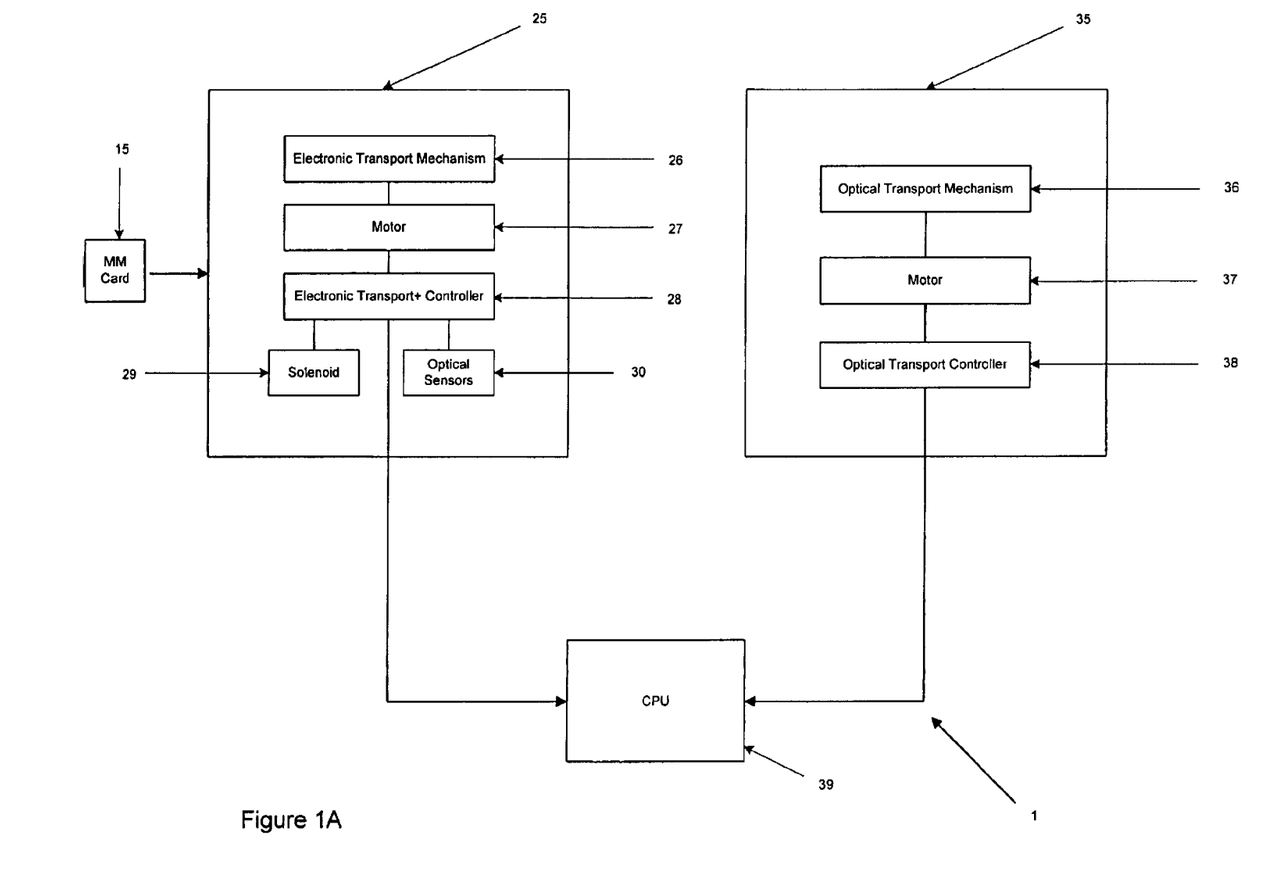
FIGS. 1A–1B present flow diagrams of systems of embodiments of the present invention.

Referring to FIG. 1A, a first embodiment of the present invention includes a dual memory read/write system 1 comprising an optical read/write component 35 having a laser type module as is known in the art, for use with an optical stripe (described above) and an electronic read/write component 25 having an electronic contact or contactless module as is known in the art, for use with a chip memory (described above) located on the same card.

The optical read/write technology is similar to a readable and writeable compact disc read-only memory (CD ROM) and requires a very precise writing and reading of the information on the optical stripe for a multi-memory card. In operation, an embodiment of the present invention includes a conventional optical read/write component 35 having a laser head that moves in a precise manner, such that writing occurs on the optical stripe. High precision is necessary to accommodate the physical size of the cards, such as smart cards or credit cards, and the relatively small size of the stripe compared to the size of the card. In an embodiment of the present invention using an optical read/write component produced by Nippon Conlux™ of Osaka, Japan, the card is moved in both an X and a Y axis, via motor 37 by an optical transport mechanism 36 in the form of two linear accelerators inside the invention. The operation of the optical read/write component 35, including the motor 37 and the optical transport mechanism 36, is controlled by an optical transport controller 38 such as a microprocessor.

An embodiment of the present invention also includes an electronic contact module meeting the International Standards Organization (ISO) 7816-2 and 7816-3 standards or a contactless module adhering to ISO-14443 standards (currently in work) for use with the chip memory of the multi-memory card. The electronic read/write component 25 for use with the chip memory includes either a conventional reader for contacting at least six of the eight contact points comprising the electronic contact module or a conventional contactless reader that utilizes known antenna/receiver technology in order to transfer data to and from the contactless antenna module embedded in the multi-memory card.

Figure 5A:
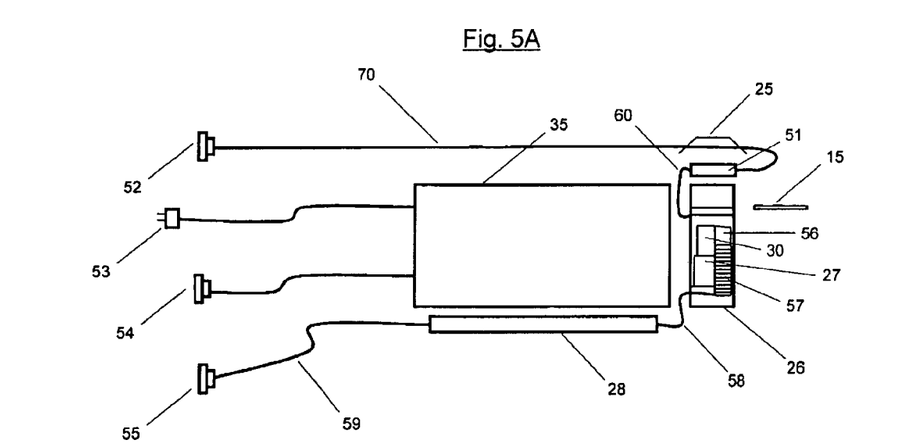
FIGS. 5A–5B present a combination of components of an embodiment of the present invention.

This multi-memory card, employing both an optical stripe as well as a chip memory, requires a dual read/write system. In a first embodiment, an electronic read/write component is attached to the front of an existing optical read/write component as is illustrated in FIG. 5A. Further, there is an electronic motor controlled transport mechanism (hereafter "electronic transport mechanism") 26, that draws the card to a read/write station, where the electronic read head (contacts) are brought down on the chip memory module on the multi-memory card, or, in the case of a contactless chip memory module, the module is brought within an appropriate distance of the contactless reader. In either mode of operation, optical sensors, for example, are utilized to determine positioning. If, after reading has been performed, it is determined that additional information exists on the optical stripe, the electronic transport mechanism 26 may be directed via an electronic transport controller 28 and a central processing unit 39 to feed the multi-memory card into the optical read/write component 35. Likewise, the steps of transporting and positioning the multi-memory card may be reversed and/or repeated as necessary, depending on user input commands.

Figure 1B:
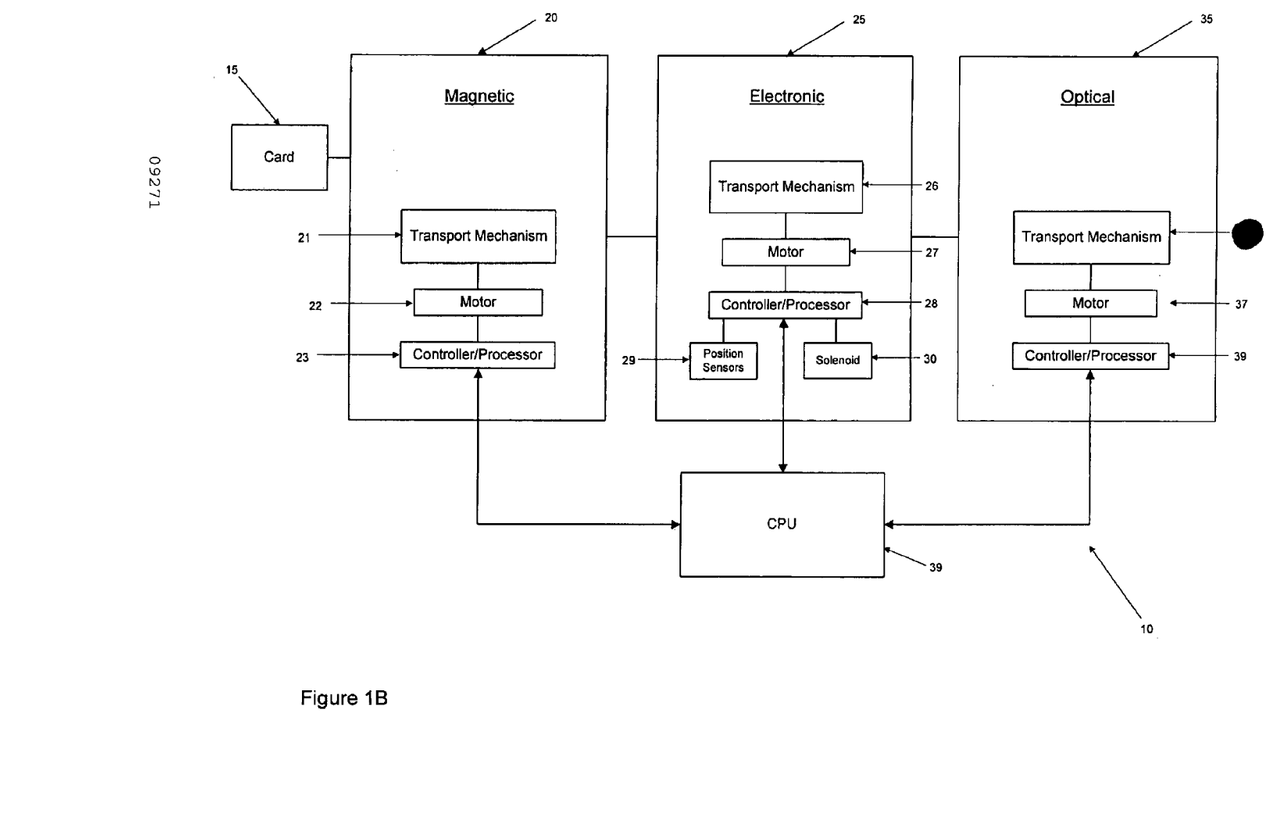

Referring to FIG. 1B, in a second embodiment of the present invention, a multi-memory read/write system 10 includes a combination of a magnetic read/write component 20, having a magnetic read/write head for use with a magnetic stripe; an optical read/write component 35, having a laser type module for use with an optical stripe (described later) and an electronic read/write component 25, having an electronic contact or contactless module for use with a chip memory (described above) located on the same card.

In the second embodiment, it is possible to configure the magnetic read/write head such that it moves relative to a stationary multi-memory card via a customary servo-motor and control circuitry or via a conventional spring powered system. Alternately, the magnetic read/write head may remain stationary while the magnetic contact module portion (e.g., magnetic stripe) of the multi-memory card is moved via a motor controlled magnetic transport mechanism 21. In one embodiment, the operation of the magnetic read/write component 20, including the magnetic transport mechanism 21 and motor 22, is controlled by a magnetic transport controller 23, such as a microprocessor.

The optical and electronic read/write components comprising this second embodiment are substantially the same as those employed in the above embodiment.

Figure 5B:
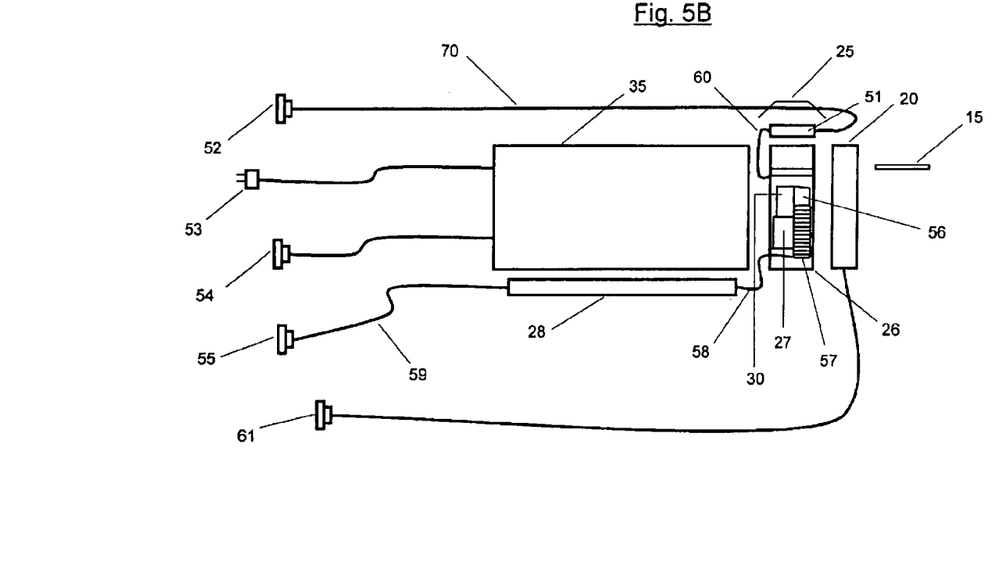

A second embodiment of the present invention includes a magnetic read/write component attached to the front of an existing electronic read/write component, which in turn fits onto the front of an existing, independent optical read/write device (illustrated in FIG. 5B). In an alternate embodiment, the magnetic read/write component (e.g., the magnetic read/write head) may simply be incorporated into a modified electronic read/write component without attaching a third component in its entirety to the front of the electronic read/write component. The second embodiment further includes a magnetic transport mechanism 21 that initially draws the multi-memory card to a first read station, where a magnetic contact module of the card is mechanically moved relative to the stationary magnetic read/write component so as to obtain identification information about the card user. This identification information could, for example, include social security number, driver license information, and passport information. Next, the magnetic transport mechanism 21 feeds the multi-memory card to an electronic transport mechanism 26, which transfers the card to an electronic read/write component 25, where, depending on the type of electronic module section (e.g., contact or contactless), the electronic read/write head contacts are brought down on the electronic memory module on the card or the electronic transport mechanism 26 positions the card in close enough proximity to the electronic read/write antenna component so as to facilitate data transfer. If after reading has been performed, it is determined that additional information exists on the optical stripe memory, the electronic transport mechanism 26 may be directed via user command and/or software programming programming to feed the multi-memory card to an optical transport mechanism 36, which transfers the card to an optical read/write component 35.

As in the first embodiment, the functions of transporting and positioning between and within the different read/write components may be repeated and reversed as required by user selected functions and/or software programming.

The user commands in both of the first and second embodiments are performed via a program on a central processing unit (CPU) 39, such as a personal computer (PC), a customer activated terminal (CAT), or an automatic teller machine (ATM), to direct the magnetic transport mechanism 20 via a magnetic transport controller 21 or the electronic transport mechanism 26 via an electronic transport controller 28, to feed the multi-memory card into the appropriate read/write component. The PC, ATM or CAT are capable of performing the conventional input/output functions via keyboards, touchscreens, display screens and the like. In an embodiment of the present invention, separate software applications control the individual elements of the separate read/write components (e.g., an optical software application developed by Laser Card Technology™ is used to read from and write to the optical stripe, while another application acts to prompt the separate control applications in response to user input and to collect and synthesize the read/write information from the magnetic, electronic and optical read/write components, respectively.

In embodiments of the present invention, control of the various components of the present invention is provided by connection to a CPU in the form of a PC that includes connection to numerous ports through separate cables or through stand alone operation, which is accomplished by combining into a cabinet a single board PC computer running a user interface, such as a system in Window® software. In the single combined package of this embodiment, the keyboard and a monitor are centrally connected to the stand-alone system. An advantage of the single board computer embodiment is that more secure transactions are performable since communication to the subsystem can include encryption of data. For example, in one embodiment, decryption key is generated from the chip memory and is used to encrypt data that is put on the optical stripe. These steps are performed in a single enclosure so that connection between components is less susceptible to interference or compromise.

In the embodiment having cables connected to the PC, the individual read/write components connect into the PC separately. If a single PC is used, there is a possibility of interference with or compromise of the security of the encrypted data.

In embodiments of the present invention, the electronic read/write component 25 includes a conventional electronic read/write component, such as the BULL™ reader and other conventional elements developed by Omron™ of Kyoto, Japan, which improved it so as to fit it on the front of the optical read/write component 35. Conventional operating elements contemplated by the electronic read/write component 25 of the present invention include side-plates, mountings, belts, gears, rollers, a motor, and a card control head, which has a solenoid-operated card contact tip, examples of which are made by GEMPLUS™ USA of Montgomeryville, Pa. and BULL™ of Louveciennes, France. These conventional operating components are known in the art. The electronic transport controller board is uniquely designed to operate with the improved system described in the embodiments of the present invention. In addition, embodiments of the present invention may include an improved face-plate for the electronic read/write component 25, which is extended and remounted to the front of the electronic transport mechanism. The face plate of one embodiment extends about 2¾ inches.

Figure 3:
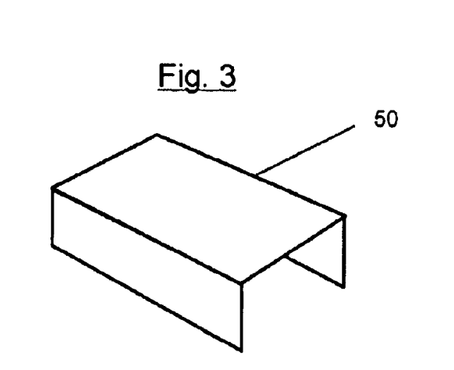
FIG. 3 presents a cover component of an embodiment of the present invention.

FIG. 3 shows a cover 50 for the multi-memory card read/write system described in embodiments of the present invention and illustrated in FIGS. 5A and 5B. The cover 50 shown in FIG. 3 serves as a cover for the multi-memory card read/write systems, shown in FIGS. 5A and 5B.

Corresponding to the first embodiment of the present invention, in FIG. 5A, the first multi-memory card read/write system 70, includes an optical read/write component 35 and an added electronic read/write component 25. Specifically, FIG. 5A shows the optical read/write component 35 with a power cord 53 and a connector 54 connectable to a PC (not shown) controller. Independent of this optical read/write component 35 is the electronic transport controller 28 that attaches to the side of the optical read/write component 35 and is bolted in place. The existing front cover (not shown) is removed from the optical read/write component 35, and a new cover (not shown in FIG. 5A; see FIG. 3) is refastened to the optical read/write component 35 and additional components. Thus, the new cover (not shown) is fabricated so that it is longer by the length of the electronic transport controller.

In addition to the electronic transport controller 28, components of an embodiment of the present invention depicted in FIG. 5A include an electronic contact head 56 on the electronic transport mechanism 26; the electronic contact head (solenoid 57 operated) 56 is also adjacent to the motor 27. Also part of the electronic read/write component is a separate off-the-shelf chip reader 51. The output of this chip reader 51 is connected to, for example, a COM1 port on a PC (not shown). The chip reader 51 is also connected 60 to the electronic contact head 56.

As shown in FIG. 5A, also connected to the electronic transport mechanism 26, and also independent of the optical read/write component 35, is an electronic transport controller 28 for providing motor 27 control and optical card position sensor 30 control in conjunction with the solenoid 57 control. The electronic transport controller 28 comprised of a circuit board with programming on it, centers and positions the card 15 via the electronic transport mechanism 26, underneath the electronic contact head 56. Control is via a solenoid 57; the card is pulled down so that the contacts on the electronic contact head 56 contact the contacts on the smart card (not shown in FIG. 5A; see FIG. 4A).

As shown in FIG. 5A, the circuit board (not shown) of the electronic transport controller 28, is also connected 59 to, for example, the COM2 port 55 of a PC (not shown). Independent of that control, the two connectors—from the chip reader 51 and the electronic transport controller 28—are connected to COM1 52 and COM2 55 of a PC (not shown). A software application on the PC (not shown) controls reading from and writing to the multi-memory card, positioning of the multi-memory card, and moving of the multi-memory card through this mechanism into the optical read/write component 35. The present invention thus includes software for the optical read/write component 35, and the necessary control and timing is also provided by the software to move and retrieve the multi-memory card from the optical read/write component 35.

Corresponding to a second embodiment of the present invention, a conventional magnetic read/write component 20 is added to the front of the electronic read/write component 25 without adding any significant length to the first multi-memory card read/write system 70, the result being multi-memory card read/write system 80 as is shown in FIG. 5B. Magnetic read/write component 20 is connected to a PC (not shown) via, for example, a COM port connection 61. Since the conventional magnetic read/write component 20 will have a face plate (not shown) incorporated thereon, the face plate that was added to the electronic read/write component 25 corresponding to the first embodiment of the present invention is no longer necessary and its length can be replaced by the magnetic read/write component 20, such that cover 50 may be used to enclose either system 70 or system 80. In operation, the magnetic transport mechanism 21 first receives the card 15 and upon completion of reading from and/or writing thereto, passes the card off to the electronic transport mechanism 25. At this point, system 80 operates in accordance with system 70 described below.

Further, in either system 70 or system 80, when the optical read/write component 35 completes its function of reading and/or writing, it ejects or passes the card 15 back to the electronic read/write component 25 via the electronic transport mechanism 28, which either repositions the card 15 if further reading from or writing thereto is necessary, or dispenses the card 15 directly to the user. Similarly, in the case of system 80, the electronic transport mechanism 26 passes the card to the magnetic read/write component 20 via the magnetic transport mechanism 21, which dispenses the card 15 to the user.

Referring to FIGS. 1A–1B and 5A–5B, in order to connect the individual read/write components of system 70 and system 80 together, such that the individual transport mechanisms are in alignment and communicate with one another so as to facilitate movement of the multi-memory card between read/write components, either the face plates and covers of the conventional optical read/write component in the case of system 70 or the face plates and covers of both the conventional optical read/write component and the conventional electronic read/write component in the case of system 80 must be removed. Once the covers and face plates are removed, the transport mechanisms of the individual read/write components are aligned, front to back, and the components are connected, such as by bolting together. Further, in both of the first and second embodiments of the present invention, the electronic transport controller 28 is located separately from the electronic read/write component 25. It is bolted to the bottom of the optical read/write component where it takes up relatively little space due to its circuit board configuration. The optical transport controller 38 and the magnetic transport controller 23 are relatively compact in their configuration compared to the electronic transport controller 28 due to their prolonged public use, which has resulted in refinement and significant improvement in lowering size specifications.

Figure 4A:
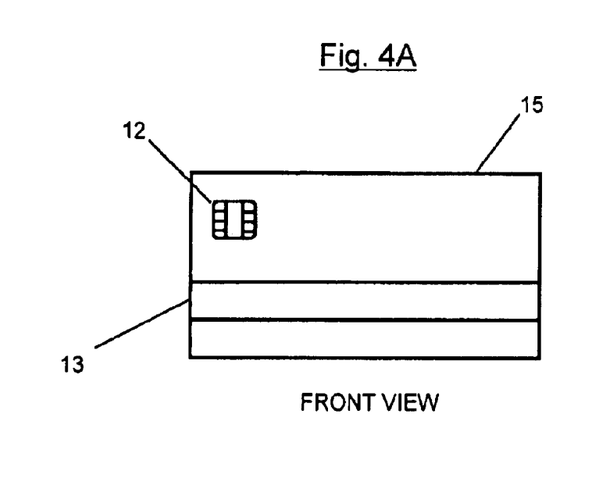
FIGS. 4A–4B present a multi-memory card of an embodiment of the present invention.
Figure 4B:
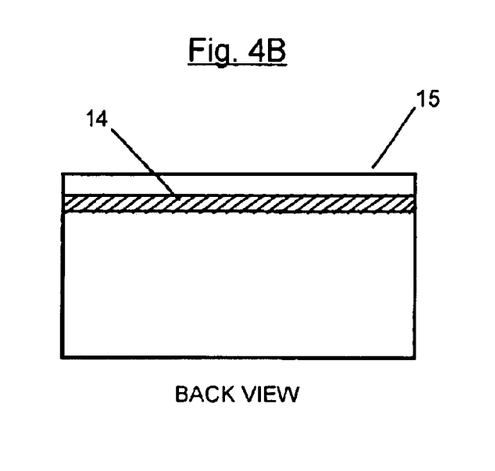

FIGS. 4A and 4B depict the front and back views of a credit card sized card 15 that has an optical stripe 13 on the front of the multi-memory card, which is approximately ¾ of an inch in width and runs the full length of the card 15 on the lower third of the card 15, in accordance with to the standard set forth in the ISO. In an alternate embodiment, the optical memory covers one entire side of the multi-memory card so as to expand memory capabilities. FIG. 4A also shows an electronic memory module 12, which is located in the standard ISO position on the front of the card. FIG. 4B depicts a magnetic stripe on the back of the card in conformance with applicable ISO standards.

A third embodiment of this invention provides a method for controlling the reading from and writing to a multi-memory card by exploiting the ability of the present invention to have independent software programs running the optical read/write component, the electronic read/write component and the electronic transport controller, while simultaneously employing another software program to integrate the data from the individual programs and provide appropriate commands and information to the user.

Figure 2:
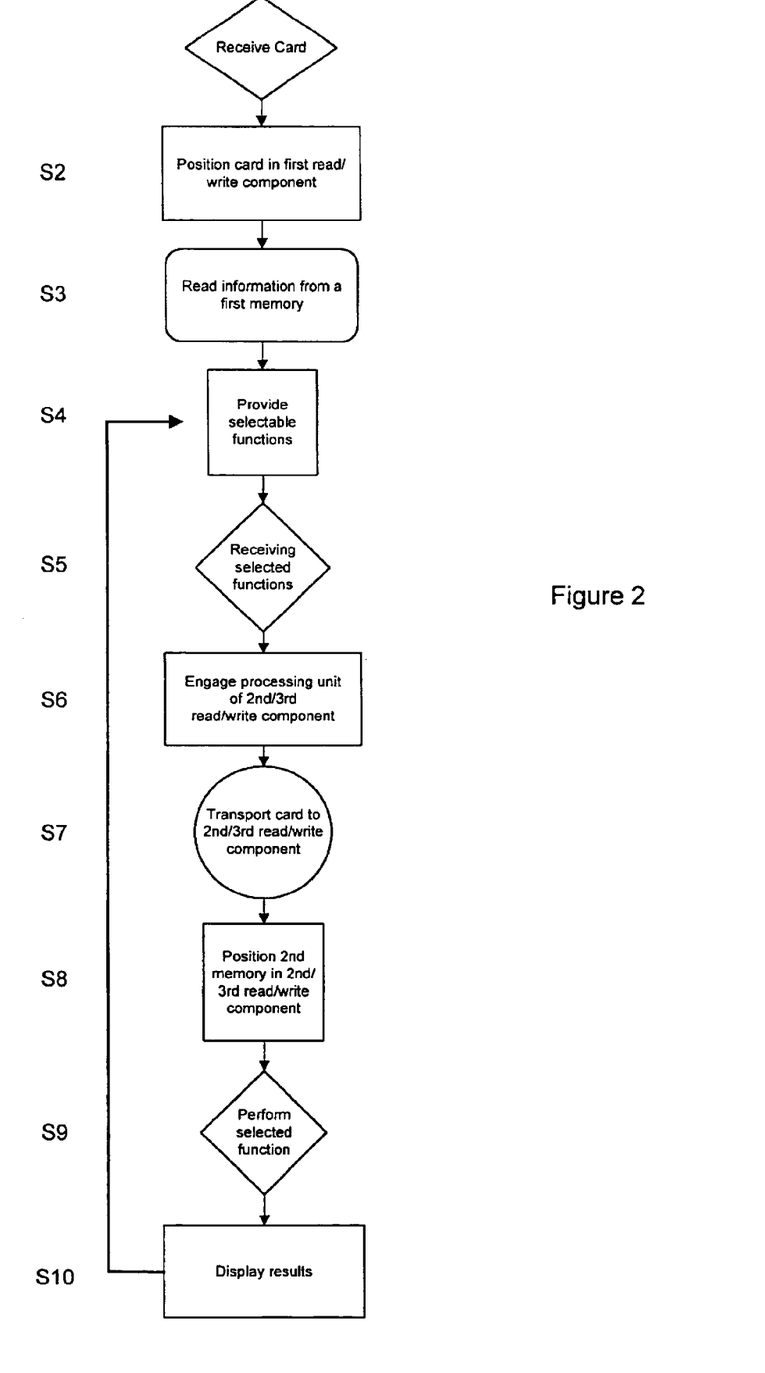
FIG. 2 presents a flowchart illustrating a method of an embodiment of the present invention.

Referring to FIG. 2, an embodiment of the present invention includes a graphical user interface (GUI) in the integrating software. An embodiment of the GUI includes user screens or menus. In an embodiment of the GUI, a user screen begins with a screen that asks the user to "Please insert your card." The card is then inserted and received initially by the electronic read/write component S1. The user is then provided with a first menu having a series of selectable functions on the menu S4. The selectable functions provided to the user via the menu include, reading information from the card and writing information to the card. More specifically, the selectable functions include but are not limited to, resetting select memories, reviewing accounts (e.g., checking, savings, money market, mutual fund, and medical), reconciling accounts with retrieved information from one or both of an internal source and an outside source, updating account balances with information retrievable from outside sources (e.g., deposit information and other recent transaction information), transferring money or balances between memories, and dispensing the card from the system. After the user selects a selectable function that is received by the CPU and the upper level application S5, depending on the selected function and the resulting read/write component that is to be employed, the upper level application engages the lower level application S6 to perform the transporting and positioning of the multi-memory card. If, for example, the selectable function selected by the user requires that information be read from or written to the optical portion of the card, after, for example, satisfying encryption/decryption requirements, the invention, under the direction of the CPU and the upper level application, automatically transports the card into the optical read/write component S7, positions the card in order to facilitate read/write functions S8, and obtains information from the optical stripe or adds information to the optical stripe, in response to user's selection from the menu S9. The results of the selected function are displayed to the user S10 along with another menu S4, thus beginning the process again.

In a further embodiment of the present invention, upon the user inserting the card in response to the "Please insert your card" prompt, the card is received by the magnetic read/write component S1, positioned therein S2 and information is read for this component for identification purposes S3. At this point, the user is presented with the menu S4, as in the previous embodiment, and the multi-memory card is automatically repositioned or ejected in response to the user's selected function.

The following specific examples are representative implementations of embodiments of the present invention.

In a first example implementation of the present invention, after insertion of the multi-memory card, the user is provided with selectable functions via a menu on the screen associated with the CPU. In this first example, a selectable function for the user is to "Read my transaction log," and the system proceeds to read the transaction log from the chip memory and displays the read information on the screen associated with the CPU. If there are multiple tracks of transaction logs (e.g., for a checking account, savings, purchases), the next screen that comes up after pressing "Read transaction log" asks the user to specify "Which one?" of the accounts from which to read the transaction log. The user can then bring up these logs and see what transactions have been performed as recorded on the chip memory.

In a second example implementation of the present invention, upon insertion of the multi-memory card and presentation of the menu, the user chooses the selectable function of performing a transaction in the chip memory. In this example, the user has reached the limit of the number of transactions that the user may conduct and store in the chip memory. At this point the menu provides the user with a selectable function to reset the chip memory transaction log, which, in this example results, in recorded transactions being written to the optical stripe for long term storage. The sequence for this example is as follows: the user is prompted to confirm, "Reset my transaction logs," or "Reset my chip memory"; upon confirmation, the electronic transport mechanism feeds the card into the optical transport mechanism, which positions the card to facilitate optical read/write functions. After the user selects the selectable function to "Reset my chip memory," the application obtains the transaction logs from the chip memory, stores these transaction logs in a buffer, and ultimately writes the transaction logs to the optical stripe. Upon completion of these reading and writing steps, the user is again provided with a menu having selectable functions, including the function, "Review the backup logs." If the user selects this function, the backup logs are displayed to the user on the screen. In a further example, the user is provided with an option to review not only the most recent logs, but also information over any time period the user selects. This option is performed either through programming or by retrieval from the optical stripe portion of the card.

In a third example implementation of the present invention, upon insertion of the multi-memory card and presentation of the menu, the user chooses the selectable function, "Update balances" or "Reconcile balances". These are balances resulting from the user conducting purchases with the multi-memory card at merchants using checking, savings, or stored value accounts. These transactions are also part of the transaction logs that are generated, and these selectable functions reconcile balances for these accounts and transactions on the multi-memory card's optical stripe with dates and other information, as necessary.

In a fourth example implementation of the present invention, upon insertion of the multi-memory card and presentation of the menu, the user chooses the selectable function, "Add deposits" which is followed by a menu of selected functions asking the user "To which account" (e.g., checking, savings, money market). Selection of this selectable function results in the upper level application checking the system for available deposit value information and adding the information to the selected track of the multi-memory card's optical stripe. The system automatically performs the function of reconciling with the balance in the selected account, and the user is provided with another menu that includes the selectable function of transferring money to the chip memory to, for example, replenish what the user may have used in previous transactions from checking, savings, or stored value. In addition, the user can select to have less than the total amount in the chip memory, select to indicate what is available in the chip memory, and select to designate an amount of money to use for transactions (e.g., for the next week of transactions).

At any point while the multi-memory card is in the system, the user is provided with and may select the selectable function, "Exit," which dispenses the card from the system and returns to the original screen of the CPU which prompts the next user to "Please insert your card."

The embodiments and examples presented below are merely representative of the functions and application that are within the purview of the present invention. One skilled in the art can appreciate the many variations that are implicit in the present invention.

What is claimed is:

1. A method for controlling the reading from and writing to a multi-memory card comprising:
   positioning a first memory of the multi-memory card within a first read/write component to facilitate reading from the first read/write component;
   reading information from the first memory;
   providing selectable functions in the form of a menu to a user;
   receiving a first selected function, the first selected function having an associated second read/write component;
   transporting the multi-memory card to the second read/write component according to the first selected function;
   positioning a second memory of the multi-memory card within the second read/write component to facilitate reading from and writing to a second read/write component; and
   performing the first selected function;
   displaying the results of the first selected function to the user;
   providing selectable functions to the user;
   receiving a second selected function, the second selected function having an associated third read/write component;
   transporting the multi-memory card to the third read/write component according to the second selected function;
   positioning a third memory of the multi-memory card within the third read/write component to facilitate reading from or writing thereto according to the second selected function; and
   reading from or writing to the third memory according to the second selected function.

2. The method according to claim 1, wherein the first selected function comprises reading from the second memory.

3. The method according to claim 1, wherein the first selected function comprises writing to the second memory.

4. The method according to claim 1, wherein the first read/write component is selected from the group consisting of a magnetic read/write component, an electronic read/write component, and an optical read/write component.

5. The method according to claim 1, wherein the second read/write component is selected from the group consisting of a magnetic read/write component, an electronic read/write component, and an optical read/write component.

6. The method according to claim 1, wherein the first memory is selected from the group consisting of a magnetic memory, an electronic memory, and an optical memory.

7. The method according to claim 1, wherein the second memory is selected from the group consisting of a magnetic memory, an electronic memory, and an optical memory.

8. The method according to claim 1, wherein the third read/write component is selected from the group consisting of a magnetic read/write component, an electronic read/write component, and an optical read/write component.

9. The method according to claim 1, wherein the third memory is selected from the group consisting of a magnetic memory, an electronic memory, and an optical memory.

10. The method according to claim 1, wherein the first selected function is selected from the group consisting of:
    resetting at least one of the first and second memories;
    reviewing account balances in at least one of the first and second memories;
    reconciling accounts based on information in at least one of the first and second memories;
    updating account information in at least one the first and second memories;
    transferring money to or between at least one of the first and second memories; and
    dispensing the multi-memory card.

11. The method according to claim 1, wherein the second selected function is selected from the group consisting of:
    resetting at least one of the first and second memories;
    reviewing account balances in at least one of the first and second memories;
    reconciling accounts based on information in at least one of the first and second memories;

updating account information in at least one the first and second memories;

transferring money to or between at least one of the first and second memories; and dispensing the multi-memory card.

12. A system for controlling the reading from and writing to a multi-memory card comprising:

means for positioning a first memory of the multi-memory card within a first read/write component to facilitate reading from the first read/write component;

means for reading information from the first memory;

means for providing selectable functions in the form of a menu to a user;

means for receiving a first selected function, the first selected function having an associated second read/write component;

means for transporting the multi-memory card to the second read/write component according to the first selected function;

means for positioning a second memory of the multi-memory card within the second read/write component to facilitate reading from and writing to a second read/write component; and means for performing the first selected function;

means for displaying the results of the first selected function to the user;

means for providing selectable functions to the user;

means for receiving a second selected function, the second selected function having an associated third read/write component;

means for transporting the multi-memory card to the third read/write component according to the second selected function;

means for positioning a third memory of the multi-memory card within the third read/write component to facilitate reading from or writing thereto according to the second selected function; and means for reading from or writing to the third memory according to the second selected function.

* * * * *

UNITED STATES PATENT AND TRADEMARK OFFICE
CERTIFICATE OF CORRECTION

PATENT NO. : 6,840,446 B2
DATED : January 11, 2005
INVENTOR(S) : Joseph C. Kawan It is certified that error appears in the above-identified patent and that said Letters Patent is hereby corrected as shown below:

<u>Title page,</u>
Item [74], *Attorney, Agent or Firm*, please change "George T. Marcout" to -- George T. Marcou --

<u>DRAWINGS,</u>
Sheet 2, Figure 1B, the reference numeral -- 36 -- should be applied to the "Transport Mechanism" component contained with in the Optical component 35.

Sheet 3, Figure 2, the reference character -- S1 -- should be applied to the "Receive Card" component.

Signed and Sealed this

Third Day of May, 2005

JON W. DUDAS
*Director of the United States Patent and Trademark Office*